United States Patent [19]

Bhatia et al.

[11] Patent Number: 4,635,206

[45] Date of Patent: Jan. 6, 1987

[54] METHOD AND APPARATUS FOR OSCILLATING A TOOL CARRIED BY A MANIPULATOR

[75] Inventors: Madhukar Bhatia, Naperville, Ill.; Brian J. Resnick, Cincinnati, Ohio

[73] Assignee: Cincinnati Milacron Inc., Cincinnati, Ohio

[21] Appl. No.: 661,000

[22] Filed: Oct. 15, 1984

[51] Int. Cl.⁴ .................. G06G 7/64; G05B 19/18; B25J 9/00; B23K 9/12

[52] U.S. Cl. .................... 364/474; 364/169; 364/513; 318/568; 901/2; 219/125.12

[58] Field of Search .......... 364/169, 513, 474; 228/27, 28; 219/125.1, 125.11, 125.12; 318/567, 568, 569, 570, 573, 574; 901/2, 9, 10, 14, 15, 16, 41, 42

[56] References Cited

U.S. PATENT DOCUMENTS

| | | | |
|---|---|---|---|
| 3,832,522 | 8/1974 | Arikawa et al. | 219/125.12 |
| 4,188,525 | 2/1980 | Merrick et al. | 219/125.12 |
| 4,336,440 | 6/1982 | Cook et al. | 219/125.12 |
| 4,394,559 | 7/1983 | Nomura et al. | 219/125.12 |
| 4,453,221 | 6/1984 | Davis et al. | 364/513 |
| 4,485,291 | 11/1984 | Nomura et al. | 219/125.12 |
| 4,491,718 | 1/1985 | Cook et al. | 219/125.12 |
| 4,517,438 | 9/1983 | Sugitani et al. | 219/125.12 |
| 4,538,233 | 8/1985 | Resnick et al. | 364/513 |
| 4,598,380 | 7/1986 | Holmes et al. | 364/513 |

Primary Examiner—Jerry Smith
Assistant Examiner—Jon D. Grossman
Attorney, Agent, or Firm—John W. Gregg

[57] ABSTRACT

A method and apparatus are provided for providing for controlled oscillation of a tool centerpoint associated with a function element carried by manipulator simultaneously with motion of a workpiece feature relative to a predetermined location. The tool centerpoint describes a predetermined pattern relative to the workpiece feature as a result of the combined motion. Tool centerpoint oscillation occurs in an oscillation path between two extremes determined by pattern parameters defining pattern amplitude measured with respect to a pattern longitudinal axis. The direction of the oscillation path is defined by input signals representing angles measured relative to a rectangular coordinate system used for defining the predetermined location. The rate of tool centerpoint motion is defined by an input signal representing velocity.

10 Claims, 13 Drawing Figures

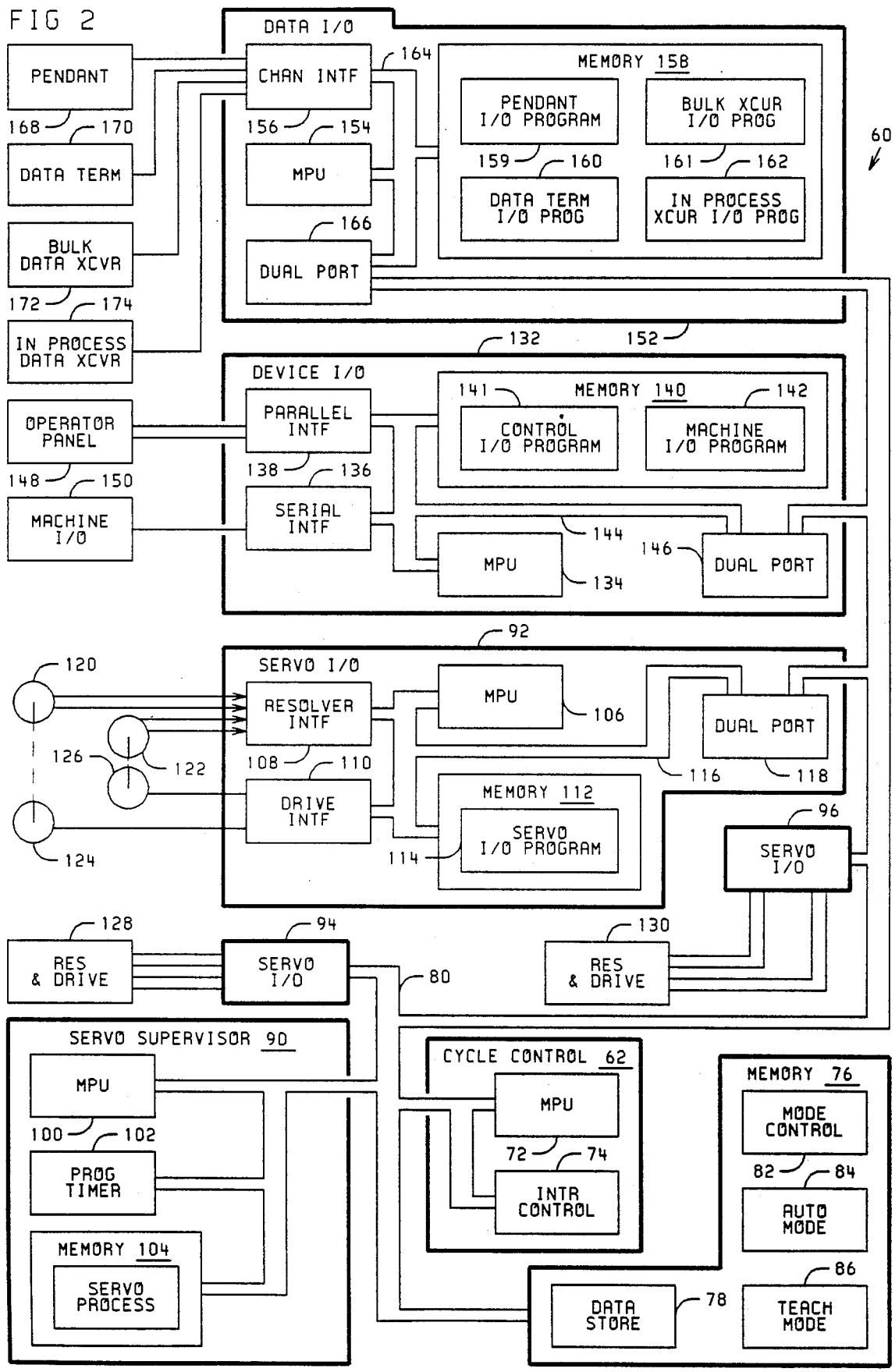

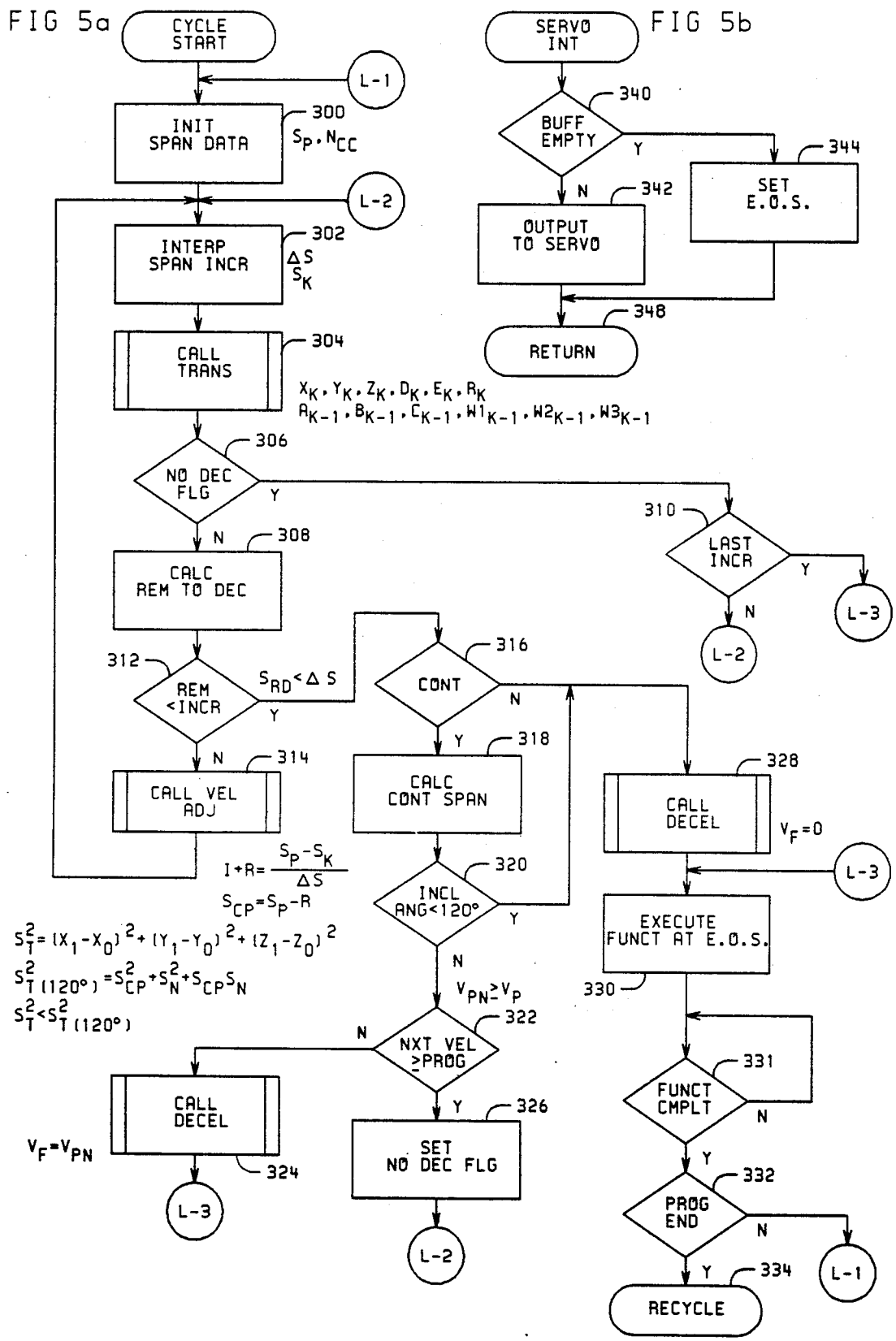

METHOD AND APPARATUS FOR OSCILLATING A TOOL CARRIED BY A MANIPULATOR

BACKGROUND OF THE INVENTION

This invention relates generally to controlling relative motion of a tool and workpiece. In particular this invention relates to controlling oscillation of a tool carried by a manipulator to produce a predetermined oscillatory pattern relative to a workpiece feature.

In general, operations for joining workpieces by welding or glueing require that the workpiece joining material be distributed across the seam or joint formed by the workpieces. Special purpose devices are known for providing oscillation of a tool tip, for example, a welding torch, through a pattern defined relative to the seam as welding progresses along the seam. Such devices may be stationary while the workpiece is moved or may move while the workpiece is stationary. Typically these devices are designed for particular applications and are not suited to doing work on both flat and cylindrical workpieces. As an improvement over these special purpose devices, program controlled manipulators are suitable for a greater variety of workpiece joining operations including both cylindrical and flat workpieces. Methods and apparatus for effecting oscillatory motion of a tool tip carried by a manipulator as it advances along a programmed path are known. However, these methods are not applicable where the workpiece is rotated to effect relative motion between the tool tip and the seam.

SUMMARY OF THE INVENTION

In light of the aforesaid disadvantages of known devices, it is one object of the present invention to provide a method and apparatus for effecting oscillation of a tool carried by a manipulator, the oscillation being controlled to produce a predetermined cyclic pattern with respect to a workpiece feature.

It is a further object of the present invention to provide a method and apparatus for cooperatively controlling a manipulator and a workpiece positioning device to effect oscillation of a tool carried by a manipulator during motion of a workpiece carried by the positioning device.

It is a still further object of the present invention to provide a method and apparatus for effecting oscillation of a tool carried by a manipulator in accordance with a predetermined pattern defining the magnitude of the oscillatory excursions, the oscillations occurring in an oscillation path through a predetermined location and in a programmed direction.

In accordance with the aforesaid objects, the present invention provides a method and apparatus for effecting oscillation of a tool carried by a manipulator. The direction of oscillation is described by orientation angles of a line through a selected location defined by input signals representing coordinates of the location. The magnitude of oscillatory excursions with respect to the selected location are determined by input signals representing pattern parameters including left and right amplitudes, left and right dwell periods, a cyclic repetition rate, and a velocity. A control for the manipulator iteratively produces increments along a pattern longitudinal axis. The control determines the magnitude of the pattern amplitude for each iteration and effects motion of the tool in the oscillation path to place the tool centerpoint at the computed excursion amplitude. Oscillation occurs in response to input signals representing functions defining conditions during which no other motion of the tool takes place. Oscillation is selectively carried on in response to these functions for a predetermined period of time or until the occurrence of a predetermined event.

BRIEF DESCRIPTION OF THE DRAWINGS

FIG. 2 is a block diagram of the control of FIG. 1.

FIGS. 3(*b*) and 3(*c*) show the axis of motion of the manipulator wrist and the associated orientation angles.

FIGS. 4(*b*) and 4(*c*) show the motions effected respectively by the manipulator and the positioner and the intended resultant pattern effected by the relative motion of the tool and workpiece.

FIGS. 5(*a*) and 5(*b*) are flow charts of the two principal control procedures for effecting motion of the manipulator.

DESCRIPTION OF THE PREFERRED EMBODIMENT

For the purposes of illustrating the present invention, a manipulator and control shown in the accompanying drawing shall be described in detail. This manipulator and control correspond to those manufactured by Cincinnati Milacron Inc., the assignee of the present invention. While the detailed description of the preferred embodiment shall necessarily reflect the actual implementation, such details should not be construed as limitations on the present invention which is defined by the appended claims.

Figure 1:
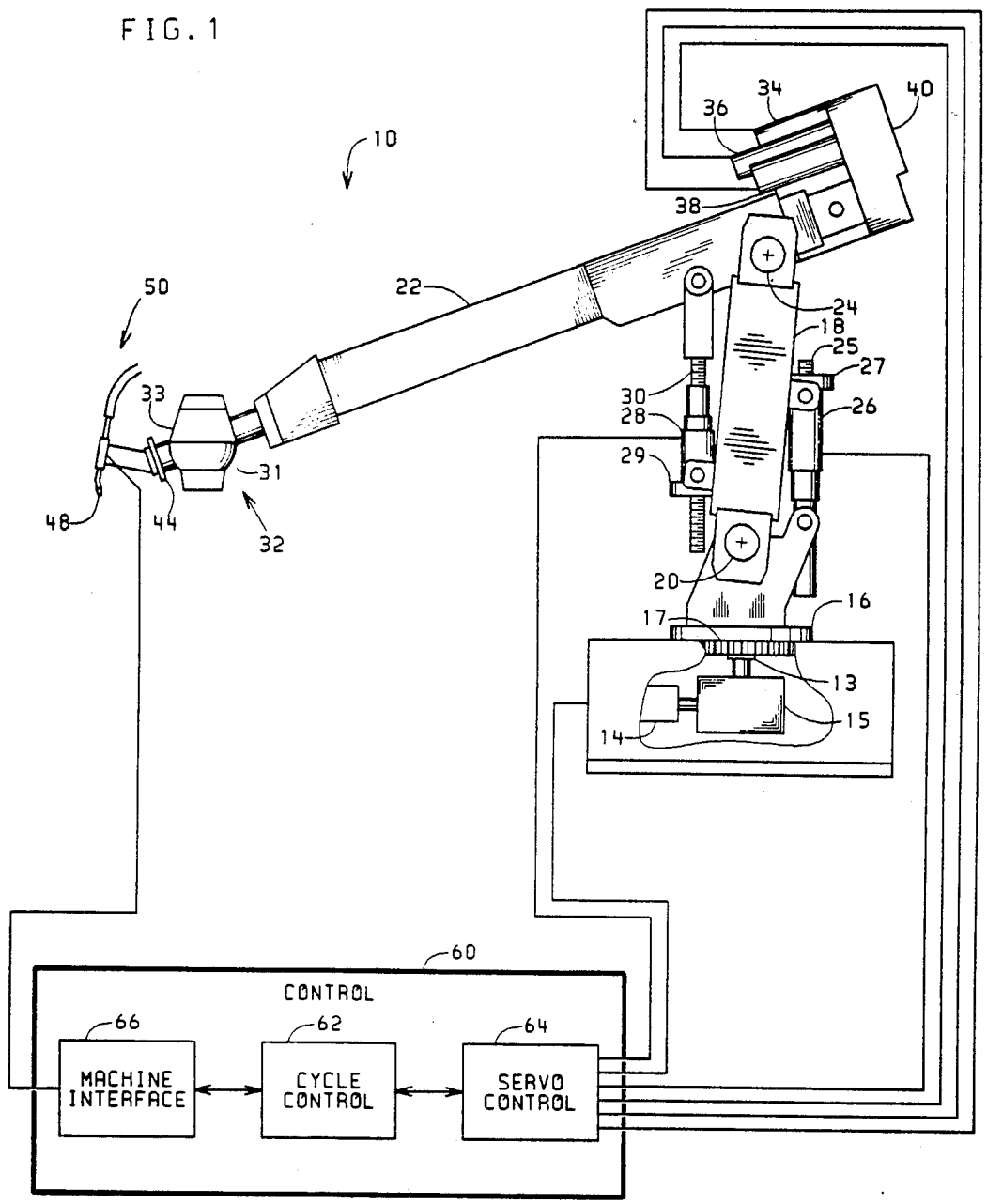
FIG. 1 shows an industrial manipulator and the schematic connection thereof to a control.

Referring to FIG. 1, a manipulator 10 is shown carrying a tool 50 and connected to a control 60. The manipulator is constructed so that the motion of its members describe axes of rotation. The first of these axes is called the base axis and is defined by rotation of the plate 16 about a vertical axis through its center. An upper arm 18 rotates about a horizontal axis, called the shoulder axis, through the center of pivot 20 intersecting the vertical axis of rotation of the base. A forearm 22 rotates about a horizontal axis called the elbow axis, through the pivot 24. Mounted at the end of forearm 22 is wrist 32 which provides three additional axes of rotation. The first of these is rotation of segment 33 about an axis lying parallel to or coincident with the longitudinal center line of forearm 22; the second is rotation of segment 31 about an axis perpendicular to the slice separating the inner segment 33 from the outer segment 31; and, the third is rotation of face plate 44 about an axis orthogonal thereto and through its center.

Rotations of members about the base, shoulder, and elbow axes are sufficient to define locations within the operating volume of the manipulator of a tool centerpoint 48 associated with the tool 50. Rotations of the inner and outer segments of the wrist 32 and the face plate 44 control orientations of the tool at the programmed locations in accordance with programmed orientation angles. Each of the six axes of motion is servo controlled by connection of drive and measurement devices to servo control 64 of the control 60. Operation of the tool 50 is accomplished by a machine interface 66 which responds to the programmed cycle of operation controlled by the cycle control 62. The cycle control 62 operates upon stored location, velocity, and function data to produce control signals for the servo control 64 and the machine interface 66. As shown, the tool 50 is a welding torch and control of the welding process is effected through the machine interface in response to stored function signals. Other tools for joining, cutting, cleaning, polishing, grasping, and so forth may be substituted for the torch shown and controlled through the machine interface 66.

Rotations of the upper arm and forearm about their respective axes are achieved by the linear motions of the screws 30 and 25 through the nuts 28 and 26. Rotation of the nuts is imparted through pulleys 29 and 27 respectively by drive motors not shown. Rotation of plate 16 about its axis is accomplished through the transmission 15 driving the pinion 13 which in turn drives ring gear 17 mounted to plate 16. The drive to transmission 15 is provided by motor 14. Rotation of the axes of wrist 32 is accomplished through concentric torque tubes, not shown, within forearm 22 driven by the motors 34, 36, and 38 through transmission 40. Position signals for each movable member are produced by position transducers, such as resolvers, which may be mechanically driven by motion of the machine member or the drive motor of the machine member.

Referring now to FIG. 2, the block diagram of the control of FIG. 1 shall be described. The control is implemented using a plurality of microprocessors communicating through a common bus. Applicants have chosen to use the commercially available 8085 and 8086 microprocessors produced by Intel Corporation. It will be recognized by those skilled in the art that any other suitable general purpose digital computer could be used to implement the control algorithms to be described hereinafter.

Cycle control 62 includes microprocessor 72 and interrupt control 74 both tied directly to the system bus 80. Operating system programs executed by microprocessor 72 are stored in memory 76 and include the programs identified as mode control 82, auto mode 84 and teach mode 86. Data defining the user specified locations, velocities and functions are stored in data store 78. Memory 76 is connected directly to system bus 80. The set of programs identified as auto mode 84 are used by microprocessor 72 to execute the cycle of operation defined by the data stored in data store 78. Execution of the auto mode program is carried out by microprocessor 72 until execution is interrupted by an interrupt signal processed by interrupt control 74. While a variety of interrupts may be necessitated by equipment associated with control 60, only a single interrupt signal, produced by the servo control, is of relevance to the present invention.

Servo control 64 includes the servo supervisor 90 which preprocesses servo command signals produced by cycle control 62 and the servo input/output modules 92, 94 and 96 associated with the actual control of the manipulator axis drive motors. Servo input/output module 97 is associated with control of the workpiece positioner. The servo supervisor 90 includes a microprocessor 100, a programmable timer 102, and local memory 104 including the servo control process programs 105. Servo interrupt signals are periodically produced by the programmable timer 102. The period between interrupt signals defines the time interval of each iteration of the path control procedures executed by the cycle control. The servo supervisor 90 receives machine axes command signals representing increments of motion of the manipulator members relative to their axes of rotation to be effected during the iteration interval. These machine axis command signals are processed by the servo supervisor 90 to produce servo command signals defining sub-increments for each of the machine axes effective for subdivisions of the iteration interval. The servo command signals are distributed to the servo input/output modules 92, 94 and 96 at predefined sub-intervals of the iteration interval. The servo input/output modules 92, 94 and 96 use the servo command signals and feedback signals produced by position transducers to control the machine axes drive motors.

The block diagram of the servo input/output module 92 is representative of the interconnection of elements of the servo input/output modules 94 and 96. Data is transferred to and from the module from the system bus 80 through the dual port device 118. The module includes a local bus 116 interconnecting a microprocessor 106 with the dual port device 118, a local memory 112, the drive interface circuitry 110, and the machine axis position measuring transducer interface 108. The microprocessor 106 controls two machine axis drive motors, such as motors 124 and 126 in response to the servo command signals and the feedback signals according to the servo input/output program 114 stored in memory 112. Each machine axis servo command signal is compared to the corresponding current position signal as defined by the position transducer to produce a position error signal which is then applied to the drive interface circuitry 110 to produce a drive control signal for application to the associated machine axis drive motor. Keeping in mind that each servo I/O module controls two machine drive axes, the blocks 128 and 130 are understood to each represent two pairs of resolvers and drive motors. Servo command signals represent increments of machine axis motion to be effected within a few milliseconds. By contrast the machine axis command signals represent increments of machine member motion to be effected within the iteration interval of 10 to 20 milliseconds.

In addition to the generation of the machine axis command signals, cycle control 62 controls the execution of functions represented by input signals and associated with the tool 50 and a workpiece positioner to be performed at programmed locations. Function commands are stored with the program data in data store 78 and are executed in accordance with function execution sub-routines associated with the auto mode programs 84. Control of machine functions is effected through input/output devices, such as limit switches, push buttons, relays and solenoids. The machine input/output devices are directly controlled by the device I.O. module 132 in cooperation with the machine input/output interface circuitry 150. Data is transferred to and from the system bus 80 through the dual port device 146. The dual port device 146 is connected to the local bus 144 of the device input/output control module 132. Operation of the module is controlled by the local microprocessor 134 connected to bus 144 which executes programs stored in the local memory 140.

Connection of the machine input/output interface circuitry 150 to module 132 is accomplished through a serial interface circuit 136. A control cabinet operator panel 148 is connected by parallel lines to a parallel interface circuit 138. Monitoring and control of the interface circuits 138 and 136 are accomplished by the microprocessor 134 in response to respectively the control I.O. program 141 and the machine I.O. program 142 stored in local memory 140. Current conditions of machine input/output devices are reflected from the device status signals transferred from the device I.O. module through the dual port device 146 to the cycle control 62. Function command signals produced by cycle control 62 in accordance with the stored program of operation are transferred over system bus 80 through dual port device 146 and ultimately to the appropriate machine input/output interface device by the serial interface 136.

In addition to signal exchange between machine device interfaces, the control permits exchange of data through the data input/output module 152 and its associated interfaces. While the cycle control 62 is operating under the auto mode programs 84, location data may be exchanged in response to function commands. This in-process data exchange takes place between an in-process data transceiver 174 and the control 60 through the data I.O. module 152. Location data from data store 78 is transferred from system bus 80 to the data I.O. module through its dual port device 166. The data I.O. module microprocessor 154 operating under control of the in-process transceiver I.O. program 162 stored in its local memory 158 transfers the location data from dual port device 166 to the serial channel interface 156 for transmission to the in-process data transceiver 174. In reverse, data from the in-process data transceiver 174 is input to the serial channel interface 156 and transferred therefrom on the local bus 164 to the dual port device 166. From there data is available to the cycle control 62 on the system bus 80.

In addition to the in-process data exchange just described, program data may be exchanged between the data store 78 of memory 76 and a bulk data store through a bulk data transceiver 172 or to a data terminal 170. Examples of a bulk data store include serial tape and data disk devices. A data terminal 170 may be used to display and modify program data for restorage after modification. In either event data is exchanged by the date I/O module microprocessor 154 operating in response to the appropriate program set such as, for example, the data terminal I/O program 160 or the bulk data transceiver I/O program 161. Data is transferred to and from the external device through the serial data interface 156 to the local bus 164 and through the dual port device 166 connected to system bus 80.

One final data input/output device, the teach pendent 168 is associated with the execution of teach mode programs 86 by the cycle control 62. Location and function data defining a programmed cycle of operation may be generated by an operator using the teach pendent 168. This pendent permits manual operation of manipulator 10 and the storage of location and function data in data store 78. As with the other data input/output devices, data is transferred to and from pendent 168 through the serial channel interface 156 to local bus 164 and therefrom through the dual port device 166 to the system bus 80. As the teach mode of operation does not form a part of the present invention further details thereof shall not be given herein. Additional details of the operation of the robot in the teach mode may be found in U.S. Pat. No. 3,920,972.

Figure 3A:
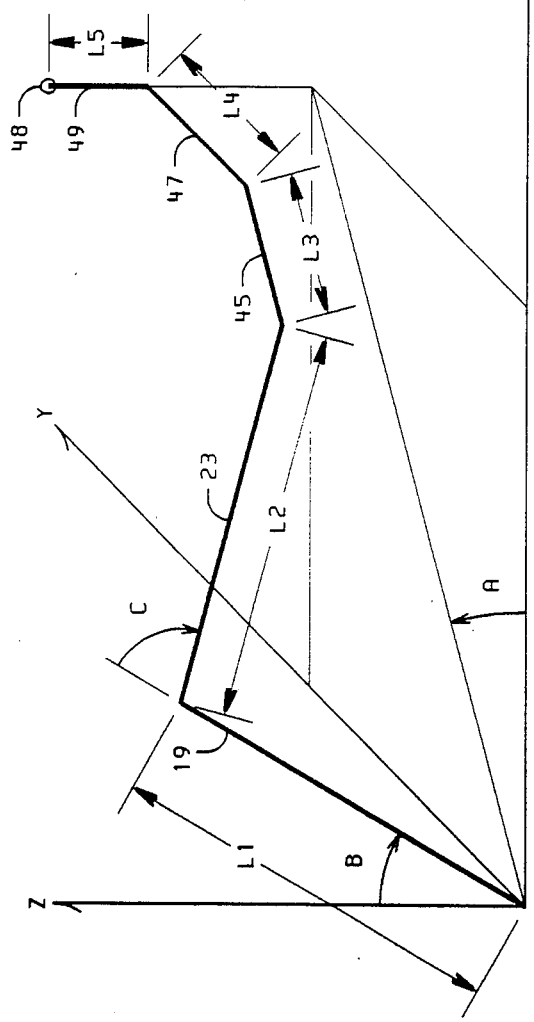
FIG. 3(*a*) is a schematic representation of the manipulator.

As it is an object of the auto mode programs 84 to control the motion of the manipulator members to produce motion of the tool centerpoint along a straight line path between programmed locations, a schematic representation of the manipulator shall be useful in describing the auto mode control algorithms. Such a schematic representation is depicted in FIG. 3(a). In FIG. 3(a) a series of line segments corresponding to the arm members of manipulator 10 are shown in relation to a rectangular coordinate system. The origin of this coordinate system corresponds to a point on the manipulator located at the intersection of the vertical axis of rotation of the base plate 16 and the horizontal axis of rotation through pivot 20. In this drawing, link 19 corresponds to upper arm 18, link 23 corresponds to forearm 22, link 45 corresponds to the span from the point of intersection of the three axes of rotation of wrist 32 to a point on the final axis of rotation (roll axis) the tool length distance from the face plate 44, link 47 corresponds to a first tool offset along the Y axis of a hand coordinate system and link 49 corresponds to a second tool offset along the Z axis of the hand coordinate system. Additional description of the hand coordinate system shall be provided subsequently The links of FIG. 3(a) are dimensioned respectively with lengths $L_1$, $L_2$, $L_3$, $L_4$ and $L_5$. The three axes of rotation of the base plate, upper arm, and forearm members are dimensioned by magnitudes of the angles A, B and C shown in FIG. 3(a). It will be appreciated by those skilled in the art with reference to FIG. 3(a) that the lengths $L_1$ through $L_5$ and the magnitudes of the angles A, B, and C completely define the location of the tool centerpoint 48 provided that the three axes of rotation of wrist 32 are so arranged that link 45 is along the axis of link 23. The introduction of rotation at the axes of wrist 32 provides for orientation of a function element associated with tool 50 through the tool centerpoint 48. Consequently, each set of input signals for a location includes input signals representing the rectangular coordinate values of the location of tool centerpoint 48 and the values of three orientation angles defining the orientation of the function element. The relationship of these orientation angles (Euler angles) to the wrist 32 shall be described with reference to FIGS. 3(b) and 3(c).

Figure 3B:
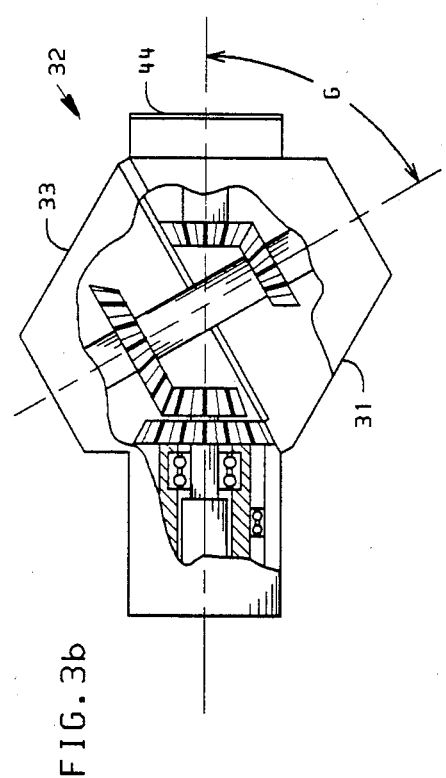

In FIG. 3(b) wrist 32 is shown to consist of an inner segment 33 by which the wrist is attached to manipulator 10 and an outer segment 31 upon which face plate 44 is carried. The first axis of rotation of wrist 32 is a rotation of segment 33 about the longitudinal axis corresponding to link 23 of FIG. 3(a). The second axis of rotation of wrist 32 is rotation of outer segment 31 about an axis perpendicular to and through the center of the slice separating the inner segment 33 from the outer segment 31. The third axis of rotation of wrist 32 is rotation of the face plate 44 about the axis perpendicular to the plane of the face plate and through the center thereof. Tool 50 is mounted to face plate 44.

Figure 3C:
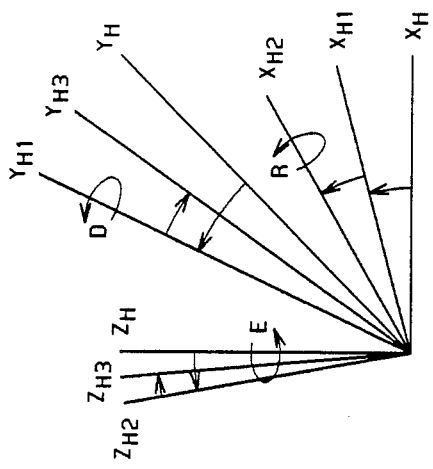

FIG. 3(c) illustrates how the orientation angles are defined with respect to a second rectangular coordinate system having its origin at the tool centerpoint 48. The axes of this coordinate system ($X_H$, $Y_H$, $Z_H$) are parallel to the axes of the rectangular coordinate system defining locations of the tool centerpoint. The angles D, E and R define rotations relative to the hand coordinate system as follows:

(1) E is the magnitude of a rotation about $Z_H$ to align $X_H$ and $Y_H$ with $X_{H1}$ and $Y_{H1}$ respectively;

(2) D is the magnitude of a rotation about $Y_{H1}$ to align $X_{H1}$ with $X_{H2}$ and $Z_H$ with $Z_{H2}$ and (3) R is the magnitude of a rotation about $X_{H2}$ to align $Y_{H1}$ with $Y_{H3}$ and $Z_{H2}$ with $Z_{H3}$.

It will now be appreciated that the arm configuration is completely defined by the X, Y and Z coordinates of the tool centerpoint 48 and the orientation angles D, E, and R when the tool length and tool offset dimensions are known.

Figure 4A:
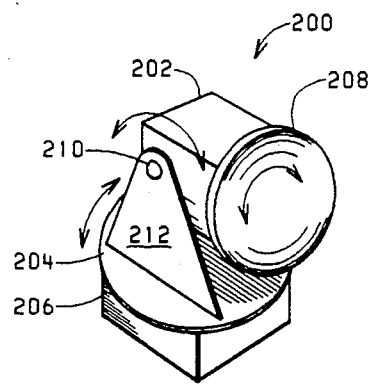
FIG. 4(*a*) shows a workpiece positioner.

Having now fully described the manipulator, and its control, the workpiece positioner shall be described with reference to FIG. 4(a). A workpiece, not shown in this Figure, is mounted on table 208 of positioner 200. The table 208 is rotatably mounted to tilting member 202. Tilting member 202 rotates about a horizontal axis through pivot point 210 and flanges 212 (only one flange is shown in FIG. 4(a)). These flanges are rigidly fixed to plate 204 which is rotatably mounted upon base 206. Plate 204 rotates about a vertical axis through its center. While all motions of the members 204, 202 and 208 of the workpiece positioner 200 could be effected by servo controlled motors, the present invention provides only for non-servo controlled rotation of table 208 simultaneously with oscillation of the tool centerpoint 48. It is to be noted that a drive motor for effecting rotation of table 208 is connected to the manipulator control through the machine input/output interface 150.

It is the object of control of the auto mode programs 84 that motion between programmed locations of the tool centerpoint 48 be along a straight line path and that changes of orientation between programmed locations be accomplished by linearization of the orientation angle changes between the programmed locations. Motions may be executed which involve changes only of position or orientation as well as changes of both. In either event the control automatically determines the appropriate machine axis values to accomplish the change of position and/or orientation at the programmed rate, while maintaining the tool centerpoint on the straight line path between programmed locations or at the programmed location of pure orientation moves.

By contrast, the present invention oscillates the tool during execution of a programmed function when no other motion of the tool is being effected. Nevertheless, the oscillatory excursion is controlled by interpolation along the longitudinal axis of a predetermined pattern defining the magnitude of oscillatory excursions. In this manner, by appropriately matching the rate of advance of a workpiece feature relative to a predetermined location while simultaneously oscillating the tool on an oscillation path through the same predetermined location, a desired welding or glueing pattern may be applied to the workpiece feature.

The relative motions to be effected by the manipulator and workpiece positioner are illustrated and shall be described with reference to FIG. 4(b). A segment of a workpiece 240 which would be mounted to the positioner table 208 is shown having a flange 242 and a barrel 244 to be joined along seam 246 by welding. The workpiece is rotated in the direction indicated by arrow 248 while the welding torch tool tip is oscillated along the oscillation path 230. Oscillation of the tool occurs through a predetermined location $P_O$ defined by input signals representing the rectangular coordinates of the location. The oscillation path direction is defined by two angles indicated as O and J in FIG. 4(b) which are represented by further input signals. The angle O measures elevation of the oscillatory path 230 with respect to the X-Y plane of the rectangular coordinate system of the manipulator's input signals. The angle J is measured between the X axis of the manipulator's rectangular coordinate system and the projection of the oscillatory path in the x-y plane. The length of the oscillatory path is defined by input signals representing the left and right amplitude of a predetermined pattern. The manipulator control effects oscillation of the tool centerpoint along the oscillatory path 230 at a rate defined by a velocity input signal.

Figure 4C:
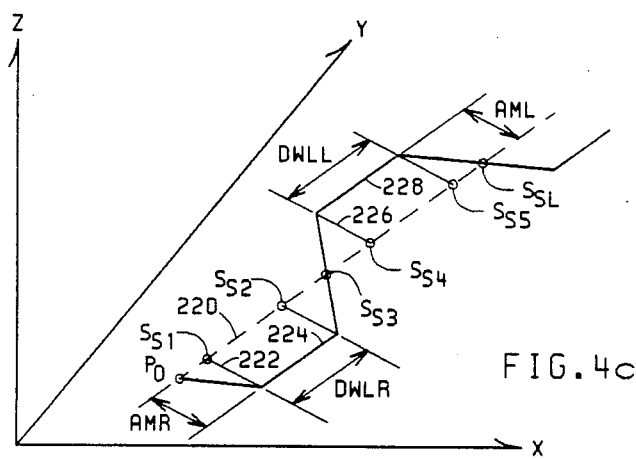

The combined rotation of the workpiece 240 and oscillation of the tool along oscillation path 230 is intended to produce an oscillatory pattern as depicted in FIG. 4(c). The pattern is defined relative to the pattern longitudinal axis 220 and includes two constant amplitude portions 224 and 228 to the right and left respectively of the pattern longitudinal axis 220. The right and left amplitudes, AMR and AML respectively, are measured along the normals 222 and 226 respectively. The right and left constant amplitude portions DWLR and DWLL are defined as percentages of the total pattern length represented by the pattern length signal $S_{SL}$ and measured from the pattern starting location $P_O$. Pattern segments are defined by pattern segment signals representing segments along the pattern longitudinal axis 220 marked by the distances $S_{s1}$, $S_{s2}$, $S_{s3}$, $S_{s4}$, $S_{s5}$, $S_{SL}$. Progress through the pattern is controlled by interpolation of increments along the pattern longitudinal axis 220. Computation of the corresponding pattern amplitude for each interpolative iteration is done in accordance with the pattern pitch, a programmed velocity, the left and right amplitudes, and the right and left dwell periods as represented by input signals. It will be appreciated that the resultant pattern relative to a workpiece feature, for example, seam 246, is a function of the actual relative velocity effected by motion of the workpiece with respect to the programmed point $P_O$. Keeping in mind that the workpiece rotation by positioner 200 is not subject to servo control, it is essential that the programmer define a value for the input velocity signal which is consistent with the controlling relative velocity effected by workpiece rotation.

As was previously stated, motion control of the present invention involves execution of the auto-mode programs 84. The auto-mode is concerned with two principal procedures, first to produce the axis command signals for each iteration and second to process the axis command signals for application to the axis drives. FIG. 5(a) is a flow chart of the overall procedure for producing axis command signals. FIG. 5(b) is a flow chart of the procedure for processing the axis command signals and applying the resultant servo command signals to the axis drives.

Referring to FIG. 5(a) at process step 300 span data variables used during interpolation between two programmed locations are initialized. These include the programmed span length $S_p$, and the coordinate component ratios Ncc. Following the initialization of the span data variables process step 302 interpolates a span increment to produce the incremental span length signal $\Delta S$ and an accumulated span length signal $S_k$. At process step 304 the end point of the span increment is transformed from the rectangular coordinates and orientation angle input data to machine coordinate data defining the magnitudes of the increments of rotation about the manipulator axes. The subroutine associated with process step 304 produces the axis command signals and stores these signals in a buffer for access by the servo supervisor 90 on the occurrence of the servo interrupt signal. Following the execution of the subroutine of process step 304 a test is made at decision step 306 to determine whether or not a flag indicating that no deceleration is required has been set. If the no deceleration flag has been set the process continues at decision step 310 where it is determined whether or not the present increment being interpolated is the last increment of the current linear span between programmed locations. If the current increment is the last increment of the span the process continues through the connector L3 to process step 330 where the function associated with the end of span is executed. At decision step 331 it is determined whether function execution is complete. Once function execution is completed, decision step 332 determines whether or not the present location is the last location of the program. If not, further programmed location data will be processed by proceeding through the connector L1. If it is the last, the entire programmed cycle of operation will be reexecuted through the recycle of terminal 334.

Returning to decision step 306, had it been determined that the no deceleration flag was not set then the execution of the procedure continues at process step 308 where the distance remaining to the beginning of a deceleration subspan is calculated. Thereafter at decision step 312 the magnitude of the remaining distance $S_{rd}$ is tested against the current incremental distance $\Delta S$ to determine whether or not the remaining distance $S_{rd}$ is less than the current incremental distance $\Delta S$. If the remaining distance is not less than the current incremental distance the process continues at step 314 where execution of a velocity modification subroutine is initiated by a subroutine call. A velocity modification subroutine may respond to any process parameter to produce changes in the incremental velocity to adapt the tool centerpoint velocity to process changes or to constrain manipulator axis velocities to their associated limits.

Referring to decision step 312, had it been determined that the distance remaining $S_{rd}$ was less than the incremental distance $\Delta S$, it must be determined whether or not deceleration is required before proceeding to the next programmed span. At decision step 316 it is determined whether or not motion is to continue through the programmed location defining the end of the current linear span. If the tool centerpoint is to come to rest at the end of the current span then decision step 316 will determine that the programmed location is not a continue point and the execution of the procedure will continue at process step 328 where execution of the deceleration subroutine is initiated by the call setting the final velocity signal $V_f$ equal to zero. Upon completion of the execution of the deceleration subroutine, execution of the overall procedure continues at process step 330 where the function command associated with the end of the current span will be executed. At decision step 331 it is determined whether function execution is complete. Once it is, decision step 332 determines whether the present programmed location is the last programmed location of the program. If it is, program execution is resumed by beginning at the first location of the stored program through the terminal 334 indicating that the program should be recycled. If the present location is not the last location of the stored program, execution proceeds through the connector L1 to interpolate the next programmed linear span.

Referring again to decision step 316, if it had been determined that the programmed location for the end of the current span is one through which motion of the tool centerpoint is to continue, execution of the overall cycle control procedure advances to process step 318 where the distance to a continue point end of span is calculated. The continue point end of span distance is found by first calculating the integral number of iterations I equal to the present incremental distance $\Delta S$ remaining in the current span length. Second, a new end point $S_{cp}$ is calculated for the current span, $S_{cp}$ being the difference between the programmed span length $S_p$ and the remainder R in excess of an integral number of current incremental distances $\Delta S$. Thereafter, at decision step 320 it is determined whether the angle included between the current linear span and the next linear span is less than 120°. If the included angle is less than 120° the motion of the tool centerpoint will be terminated at the final location $P_1$ of the current span.

The determination of the value of the included angle relies upon the rule of cosines. Two values for the span distance between the programmed location at the beginning of the present span and the programmed location at the completion of the next span are produced independently. That is, the span length $S_t^2$ is computed as the sum of the squares of the rectangular coordinate components while the value $S_t^2$ value $S_t^2$ (120°) is computed as the sum of: the square of the span length $S_{cp}$ computed in process step 318; the square of span length $S_n$ of the next span; and the product of the next span length $S_n$ and the span length of the present span $S_{cp}$. If $S_t^2$ is less than $S_t^2$ (120°) then the included angle is less than 120°.

If it is determined at decision step 320 that the included angle is not less than 120° then execution of the overall procedure continues at decision step 322 where programmed velocity of the next span $V_{pn}$ is tested against the programmed velocity of the current span $V_p$ to determine which is greater. If the programmed velocity of the next span $V_{pn}$ is greater than or equal to the programmed velocity of the current span $V_p$ then the procedure continues at 326 where the no deceleration flag is set and thereafter through connector L2 to process step 302. If it had been determined at decision step 322 that the velocity of the next span $V_{pn}$ is less than the current programmed velocity $V_p$ then deceleration in the current span would be required and the procedure would continue at process step 324 where the execution of the deceleration subroutine is initiated by a subroutine call setting the final velocity parameter $V_f$ equal to the velocity of the next programmed span $V_{pn}$. Upon completion of execution of the deceleration subroutine, execution of the overall process continues through connector L3 at process step 330 where the function associated with the end of span is executed and execution proceeds thereafter as previously described. It will now be apparent that the overall cycle control comprises the repeated execution of the stored program. Motion between two programmed locations involves the iterative production of incremental moves along the straight line path therebetween. The overall cycle comprises manipulator motion and the execution of programmed functions associated with programmed locations.

Referring to FIG. 5(b) the servo interrupt service routine executed by servo control 90 begins at decision step 340 where it is determined whether or not the buffer in which axis command signals are temporarily stored is empty. If the buffer is empty it is assumed that the cycle control has reached the end of span and an end of span signal is set at process step 344. If the buffer is found not to be empty by decision step 340 then the axis motion increments represented by the axis command signals are retrieved from the buffer at step 342. At terminal 348 the servo interrupt routine is ended and execution of the overall cycle of operation by the cycle control 62 resumes. As was previously stated the servo supervisor 90 divides the increments represented by the axis command signals into subincrements and distributes the subincrements to the servo I.O. modules. The process of division and distribution of the servo command signals continues concurrently with the execution of the overall automatic mode procedure by the cycle control 70.

The present invention effects oscillation of a tool carried by the manipulator during a period when the manipulator would otherwise be idle in response to a programmed wait or delay function. A wait function may be programmed to inhibit further program execution until the occurrence of a specified event which is detected at the machine input/output interfaces. Likewise, a delay function will suspend the execution of the program for a predetermined period of time. As noted with reference to FIG. 5(a), functions are executed at the completion of interpolation of a span between two programmed locations. Further program execution is suspended until the function execution has been completed. Rotation of the workpiece on the positioner 200 is effected during the execution of a wait or delay function. Keeping in mind that the positioner of the present invention is not equipped with servo control axes, the control of rotation is thus limited to commanded rotation for a predetermined time, or rotation to a limit, coincidence with which may be indicated by a signal at the machine interface.

Figure 6A:
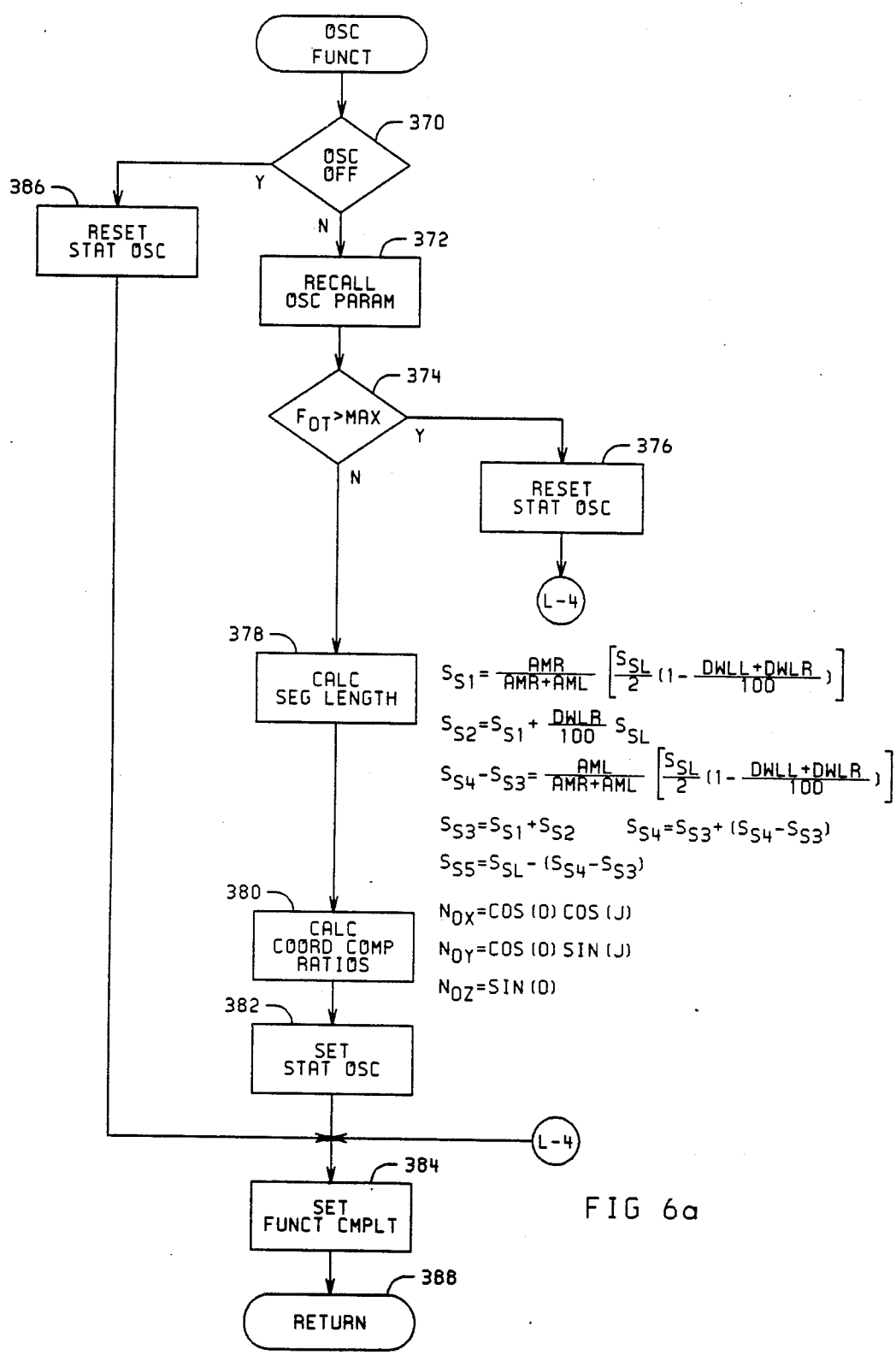
FIGS. 6(*a*) and 6(*b*) are flow charts of procedures associated with the execution of programmed functions for effecting oscillation in accordance with the present invention.

In order to effect oscillation of the tool during rotation of the workpiece, it is necessary to program an idle oscillation function which is uniquely associated with execution of a wait or delay function. Oscillation parameter data is programmed with the idle oscillation function and is used by the control to calculate the values of various quantities required to effect oscillation of the tool. The procedure for execution of the oscillation function shall be described with reference to the flow chart of FIG. 6(a).

At decision step 370 it is determined whether the idle oscillation function input signal specifies that oscillation be discontinued. The idle oscillation function operates in a modal fashion to minimize programming. Thus, once the required parameters for the idle oscillation function have been programmed these values are retained and are effective for producing oscillation of the tool whenever a delay or wait function is executed unless the oscillation off input has been programmed. If it is determined at decision step 370 that the oscillation off input has been programmed, a flag signal representing the oscillation status is reset at process step 386. Thereafter, execution of the function proceeds at process step 384 where the function complete status flag is set. Continuation of the execution of the manipulator program is effected by the return through terminal 388.

If it had been determined at decision step 370 that the oscillation function was not to be discontinued, execution of the oscillation function would continue at process step 372. Oscillation parameter data recalled at process step 372 includes the oscillation pattern length $S_{SL}$, which is equal to the inverse of the pattern pitch $F_{OL}$, a programmed velocity $V_p$; the left and right pattern amplitudes AML, and AMR; the left and right dwell percentages DWLL and DWLR, respectively; and the oscillation path direction angles J and O. At decision step 374 it is determined whether the frequency of oscillation with respect to time $F_{ot}$ is greater than a maximum permitted value. The frequency with respect to time is equal to the product of pitch $F_{OL}$ and the programmed velocity $V_p$. If at decision step 374 it is determined that the oscillation frequency is greater than the maximum permitted value, the oscillation status flag is reset at process step 376. Under these circumstances, no oscillation will be permitted and execution of the function proceeds at process step 384 where the function complete status flag is set.

If it is determined at decision step 374 that the frequency of oscillation is less than or equal to the maximum permitted, execution of the function continues at process step 378 where segment lengths along the pattern longitudinal axis 220 are computed. Each pattern segment length is associated with a pattern characteristic as shown and described with reference to FIG. 4(c). The pattern segment length calculations provide quantities which are used by the control to calculate the excursion amplitude required to produce the oscillatory pattern with respect to a workpiece feature. At process step 380 oscillation path coordinate component ratio signals are produced by calculating coordinate component ratios using sine and cosine functions of the oscillation path direction angles J and O. At process step 382 the oscillation status flag is set indicating that oscillation may be effected. Thereafter at process step 384 the function complete status flag is set indicating that function execution has been completed.

Figure 6B:
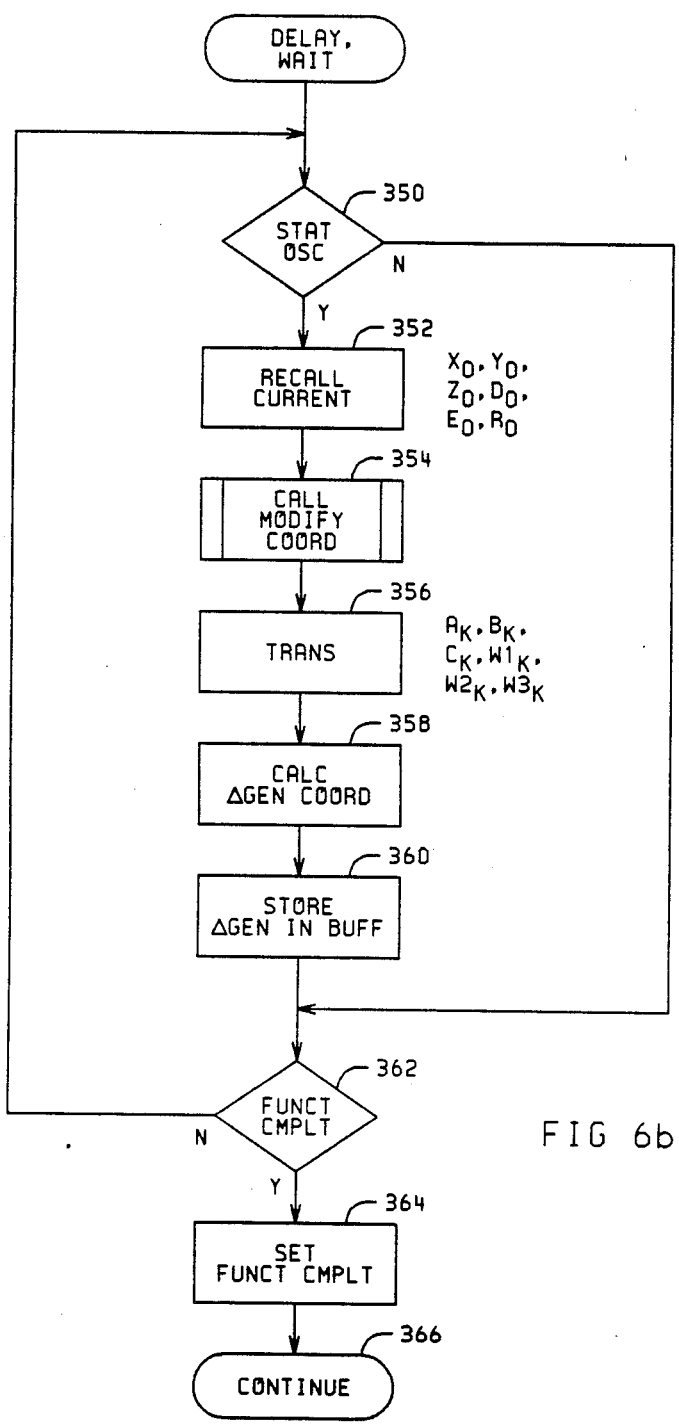

Once the oscillation function has been executed oscillation will be effected during a subsequent execution of a delay or wait function. The procedure for executing a delay or wait function during which oscillation will be effected shall be described with reference to FIG. 6(b).

With the initiation of execution of a delay or wait function it is determined at decision step 350 whether or not the oscillation status signal has been set. If not, execution proceeds at decision step 362 where it is determined whether the delay period has expired or the contingent condition of a wait function has been met. Function execution continues through the loop created by decision steps 350 and 362 until the delay period expires or the appropriate condition has been met. Thereafter, execution of the delay or wait function proceeds at process step 364 where the function complete status flag is set and execution of the manipulator program is resumed by the continue through terminal 366.

If it is determined at decision step 350 that the oscillation status flag has been set, execution would proceed at process step 352 where the rectangular coordinate signals representing the coordinates of the current location of the tool centerpoint are recalled. The current coordinates may differ from programmed coordinates of the predetermined location as a result of a coordinate offset or coordinate modification. Tool oscillation will be effected along the oscillation path through the current actual location rather than through a location represented by programmed coordinates.

At process step 354 a subroutine for modifying the coordinates of the current location is called. The modification of coordinates reflects the displacement of the tool from the current position in accordance with the amplitude defined by the iterative progression through the oscillatory pattern. Upon completion of modification of the coordinate values, modified rectangular coordinate signals are transformed to a set of machine coordinate signals at process step 356. The machine coordinate signals represent the location defined by the modified rectangular coordinates relative to the machine coordinate system. The details of the transformation process are set forth in U.S. Pat. No. 3,909,600, assigned to the assignee of the present invention.

At process step 358 the change in machine coordinates from their actual current values to the values represented by the modifications effected by process step 354 are computed. At process step 360 the change in machine coordinates are stored in a buffer for access by the servo interrupt routine shown and described with reference to the flow chart of FIG. 5 (b). Thereafter it is determined at decision step 362 whether or not the delay period has expired or the contingent condition of the wait function has been met. If not, execution of the delay or wait function is resumed through decision steps 362 and 350 and process steps 352 through 360. Once the delay period has expired or the wait function contingent condition has been met, function execution proceeds at process step 364 where the function complete status flag is set and overall execution of the manipulator program is resumed through the continue of terminal 366.

Figure 4B:
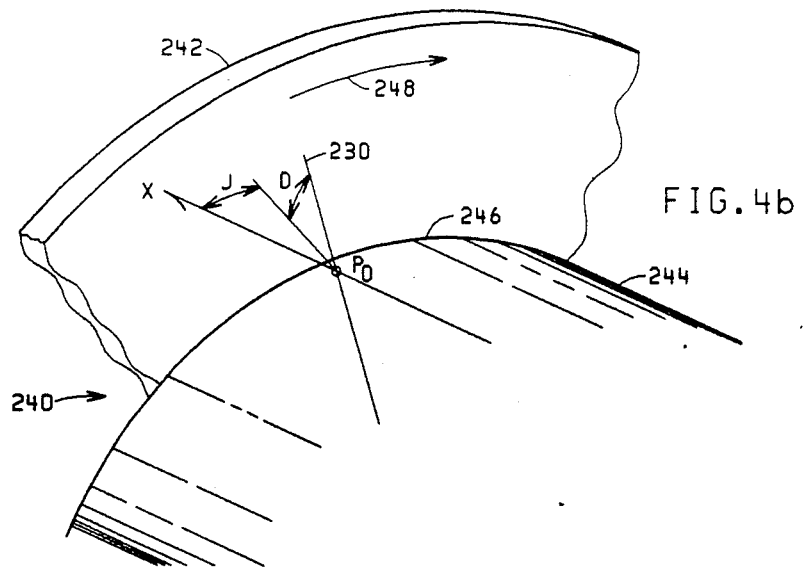
Figure 7:
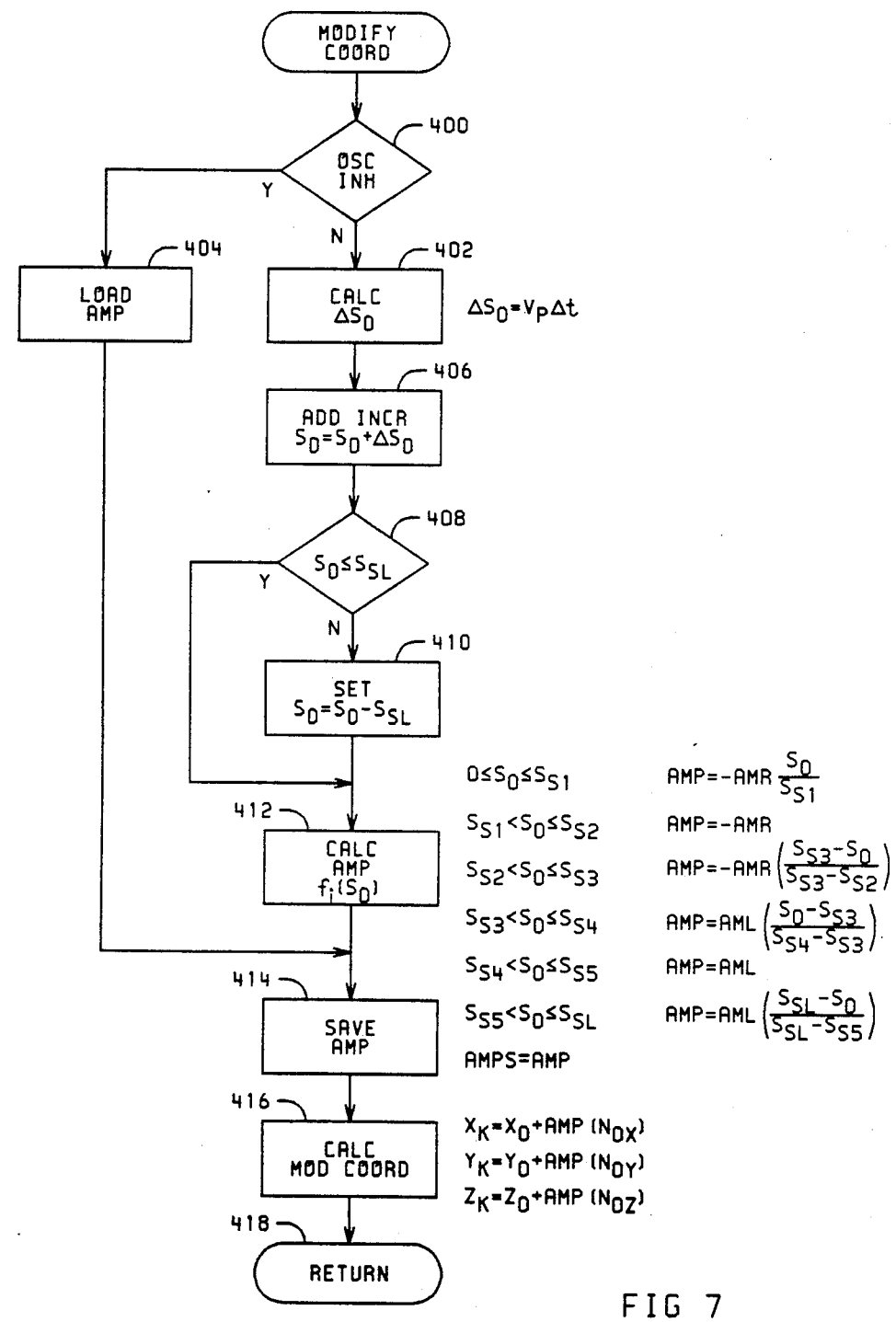
FIG. 7 is a flow chart of a subroutine used by the procedure of FIG. 6(*b*).

As noted with reference to FIG. 4(b) the oscillation effected by the present invention causes the tool centerpoint to traverse along an oscillation path 230 through the current position $P_O$ between the extremes of left and right amplitude AML and AMR. Nevertheless, it is intended by the present invention that the combined motion of the oscillation of the tool and the rotation of the workpiece produce an oscillatory pattern as described with reference to FIG. 4(c). Therefore, the amplitude of excursions of the tool to either side of the current location are determined in accordance with the predetermined pattern defined by the pattern parameters and the programmed velocity. Each iteration of the loop of execution of a delay or wait function described with reference to FIG. 6(b) will effect an incremental advance along the pattern longitudinal axis 220 and consequently produce an associated amplitude which will be represented by an excursion amplitude signal. The procedure for effecting oscillation in this fashion shall be described with reference to the coordinate modification subroutine represented by the flow chart of FIG. 7.

Beginning at decision step 400 it is determined whether or not an oscillation inhibit signal has been received through the machine input/output interface. If so, further oscillation is inhibited and the execution of the coordinate modification routine proceeds at process step 402 where the current value of excursion amplitude signal is loaded to a temporary storage location called AMP. Thereafter execution of the coordinate modification subroutine continues at process step 414 where the value of amplitude is saved. The current position rectangular coordinates are modified at process step 416 by adding the current coordinate values and the product of the current value of the excursion amplitude signal and the appropriate oscillation path coordinate component ratio signal.

If it had been determined at decision step 400 that oscillation was not inhibited, execution of the coordinate modification subroutine continues at process step 404 where an increment along the pattern longitudinal axis 220 is calculated. This increment, represented by an incremental distance signal $\Delta S_O$, is equal to the product of the programmed velocity $V_P$ and an iteration time period represented by an iteration interval signal $\Delta t$. At process step 406 an accumulated pattern distance signal $S_O$ is produced as the sum of the current value of $S_O$ and the incremental length $\Delta S_O$. The accumulated pattern distance signal represents the current measurement of progress along the pattern longitudinal axis effected by the iterative advance.

At decision step 408 it is determined whether the accumulated pattern distance signal $S_O$ is less than or equal to the oscillation pattern length signal $S_{SL}$. It will be appreciated that the pattern of oscillation may be repeated during the execution of a single delay or wait function and it is therefore necessary to adjust the magnitude of the accumulated pattern distance signal to a value less than or equal to the pattern length signal. Once the accumulated pattern distance signal $S_O$ exceeds the oscillation pattern length signal $S_{SL}$ the accumulated pattern distance signal $S_O$ is forced to a value less than one oscillation pattern length. This adjustment of the value of the accumulated oscillation length is effected by decision step 408 and process step 410 which sets a new value for the accumulated pattern distance signal $S_O$ equal to the current value less the oscillation pattern length signal $S_{SL}$.

Calculation of the oscillation pattern excursion amplitude is effected at process step 412 using the accumulated pattern distance signal $S_O$. The excursion amplitude is a function of the progress through the oscillation pattern as measured by the accumulated pattern distance signal $S_O$. Therefore, six functions, one function associated with each pattern segment computed during execution of the oscillation function, are used to calculate the appropriate value of the excursion amplitude signal AMP. These calculations are carried out in accordance with the equations set forth to the right of process step 412 in FIG. 7. With each iteration through the loop of the flow chart of FIG. 6(b), a new value of the accumulated pattern distance signal $S_O$ is produced reflecting progression through the oscillation pattern. The associated excursion amplitude is then produced in response to the accumulated oscillation distance $S_O$ at process step 412.

At process step 414 the value of amplitude calculated at process step 412 is stored in a temporary buffer AMPS. Thereafter at process step 416 the rectangular coordinates of the recalled current position are modified by adding excursion coordinate component signals to them, the excursion coordinate component signals representing rectangular coordinate components of the excursion amplitude. The excursion coordinate component signals being defined by the product of the excursion amplitude and the appropriate oscillation path coordinate component ratio. Execution of the procedure associated with the delay or wait function is resumed by the return through terminal 418.

It will now be appreciated that the oscillation of the tool centerpoint effected by the present invention is not dependent on the definition of any path other than the directions of the line along which oscillation occurs. Further, while the invention is intended for simultaneous oscillation of the tool through the predetermined location and movement of the workpiece feature relative to the predetermined location, the control of oscillation is not dependent on motion of the workpiece. In addition, while the preferred embodiment illustrates the simultaneous oscillation of the tool centerpoint and rotation of the workpiece, the desired pattern could well be achieved relative to the workpiece feature by linear motion of a workpiece.

While the preferred embodiment has been described in some detail with respect to the particular discontinuous pattern chosen by applicants for applications in welding, it is to be noted that other suitable patterns of oscillation may be adapted to the control techniques described herein. In addition, continuous oscillatory patterns, expressible as a cyclic function of displacements along an imaginary line could be used so long as a suitable expression for the pattern amplitude is assumed in producing excursion amplitude signals associated with progress through the pattern. It is not intended to limit the present invention to a particular oscillatory pattern or a particular machine configuration, but rather it is intended to cover all modifications, alterations and equivalents falling within the spirit and scope of the appended claims.

What is claimed is:

1. A method for oscillating a tool centerpoint in a line through a predetermined location, the tool centerpoint being associated with a function element carried by a manipulator having movable members and actuators for effecting motion of the members, a predetermined pattern of motion being defined by input signals representing pattern parameters measured relative to a pattern longitudinal axis and including pattern pitch and pattern amplitude, the line of oscillation having a direction defined by further input signals, the rate of motion of the tool centerpoint being defined by an input signal representing velocity, and the duration of oscillation being determined in response to input signals representing functions selectably defining a predetermined period of time and an indefinite period terminating on occurrence of a predetermined event, the method comprising the steps of:

(a) moving a workpiece feature relative to the predetermined location in response to the input signal representing a function;

(b) periodically producing iteration interval signals, each iteration interval signal representing a period of time during which an increment of motion of the tool centerpoint is to be effected by the manipulator;

(c) producing an accumulated pattern distance signal in response to the input signals representing velocity and pattern pitch and the iteration interval signal, the accumulated pattern distance signal representing a distance along the pattern longitudinal axis;

(d) producing an excursion amplitude signal in response to the input signals representing pattern parameters and the accumulated pattern distance signal, the excursion amplitude signal representing the pattern amplitude corresponding to the accumulated pattern distance;

(e) effecting motion of the tool centerpoint on the line of oscillation to a point spaced from the predetermined location by the distance defined by the excursion amplitude signal;

(f) iterating steps (b) through (e) for the period defined by the input signal representing a function to oscillate the tool centerpoint in the oscillation line thereby producing relative motion of the tool centerpoint and the workpiece feature in accordance with the predetermined pattern.

2. The method of claim 1 wherein the function represented by the input signal defines a predetermined period and the iteration of steps (b) through (e) ceases on the expiration of the predetermined period.

3. The method of claim 1 wherein the function represented by the input signal defines a contingent condition and the iteration of steps (b) through (e) ceases on the occurrence of the predetermined event.

4. The method of claim 1 wherein the step of producing an accumulated pattern distance signal further comprises the steps of:

(a) producing an incremental distance signal in response to the input signal representing velocity and the iteration interval signal, the incremental distance signal representing an incremental advance along the pattern longitudinal axis;

(b) accumulating the incremental distance signals;

(c) comparing a total of the accumulated incremental distance signals with a pattern length defined by the input signal representing pattern pitch; and (d) subtracting the pattern length from the total of the accumulated incremental distance signals in response to detecting that the total of the accumulated incremental distance signals exceeds the pattern length.

5. The method of claim 4 wherein the step of producing excursion amplitude signals further comprises the steps of:

(a) producing pattern segment signals in response to the input signals representing pattern parameters, each pattern segment signal representing a segment along the pattern longitudinal axis associated with a single function defining pattern amplitude;

(b) comparing the accumulated pattern distance signal to the pattern segment signals; and (c) producing the excursion amplitude signal in response to the magnitude of the accumulated pattern distance signal and the function associated with the pattern segment within which the accumulated pattern distance signal falls.

6. An apparatus for oscillating a tool centerpoint in a line through a predetermined location, the tool centerpoint being associated with a function element carried by a manipulator having movable members and actuators for effecting motion of the members, the oscillation occurring simultaneously with motion of a workpiece feature relative to the predetermined location, a predetermined pattern of motion being defined by input signals representing pattern parameters measured relative to a pattern longitudinal axis and including pattern pitch and pattern amplitude, the line of oscillation having a direction defined by further input signals, the rate of motion of the tool centerpoint being defined by an input signal representing velocity, and the duration of oscillation being determined in response to input signals representing functions selectably defining a predetermined period of time and an indefinite period terminating on occurrence of a predetermined event, the apparatus comprising:

(a) means responsive to the input signal representing a function for moving the workpiece feature relative to the predetermined location;

(b) means for periodically producing iteration interval signals during the period determined by the input signal representing a function, each iteration interval signal representing a period of time during which an increment of motion of the tool centerpoint is to be effected by the manipulator;

(c) means responsive to the iteration interval signal and the input signals representing velocity for producing an accumulated pattern distance signal representing a distance along the pattern longitudinal axis;

(d) means responsive to the accumulated pattern distance signal and the input signals representing pattern parameters for producing an excursion amplitude signal representing the pattern amplitude associated with the pattern longitudinal distance represented by the accumulated pattern distance signal;

(e) means responsive to the excursion amplitude signal for producing servo command signals representing increments of motion of the machine members for effecting motion of the tool centerpoint on the oscillation line to a point spaced from the predetermined location by the distance defined by the excursion amplitude signal; and (f) means for applying the servo command signals to the servo mechanism circuit to oscillate the tool centerpoint in the oscillation line thereby producing relative motion of the tool centerpoint and the workpiece feature in accordance with the predetermined pattern.

7. The apparatus of claim 6 wherein the means for producing an accumulated pattern distance signal further comprises (a) means for producing an incremental distance signal representing a distance along the pattern longitudinal axis having a magnitude equal to the product of velocity and the iteration interval time period;

(b) means for accumulating the incremental distance signal;

(c) means for comparing a total of accumulated incremental distance signals with a length of the pattern defined by the input signal representing pattern pitch; and (d) means for subtracting the pattern length from the total of accumulated incremental distance signals in response to detecting that the total of the accumulated incremental distance signals exceeds the pattern length.

8. The apparatus of claim 7 wherein the means for producing an excursion amplitude signal further comprises:

(a) means for producing pattern segment signals, each pattern segment signal representing a segment of the pattern longitudinal axis for which pattern amplitude is defined by a single function;

(b) means for comparing the accumulated pattern distance signal and the pattern segment signals;

(c) means for computing a magnitude of pattern amplitude in accordance with the function associated with the pattern segment within which the accumulated pattern distance signal falls.

9. The apparatus of claim 6 wherein the predetermined location is defined by rectangular coordinates, and the manipulator members and axis of motion of the manipulator define a machine coordinate system and the means for producing servo command signals further comprises:

(a) means for recalling the rectangular coordinates of the predetermined location;

(b) means responsive to the excursion amplitude signal for modifying recalled rectangular coordinates to produce modified rectangular coordinate signals representing rectangular coordinates of the location on the oscillation path the excursion amplitude away from the predetermined location; and (c) means for transforming the modified rectangular coordinate signals to machine coordinate signals representing the location defined by the excursion amplitude relative to the machine coordinate system.

10. The apparatus of claim 9 wherein the means for modifying rectangular coordinates further comprises:

(a) means responsive to the excursion amplitude signal for producing excursion coordinate component signals representing rectangular coordinate components of the excursion amplitude; and (b) means for adding the excursion coordinate component signals to the recalled rectangular coordinates.

* * * * *